United States Patent
Lou et al.

(10) Patent No.: US 11,666,891 B2
(45) Date of Patent: Jun. 6, 2023

(54) HIGHLY ACTIVE METAL OXIDE SUPPORTED ATOMICALLY DISPERSED PLATINUM GROUP METAL CATALYSTS

(71) Applicants: Yang Lou, Tempe, AZ (US); Jingyue Liu, Scottsdale, AZ (US)

(72) Inventors: Yang Lou, Tempe, AZ (US); Jingyue Liu, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 17/833,285

(22) Filed: Jun. 6, 2022

(65) Prior Publication Data

US 2022/0305465 A1 Sep. 29, 2022

Related U.S. Application Data

(63) Continuation of application No. 16/898,173, filed on Jun. 10, 2020, now Pat. No. 11,351,522.

(Continued)

(51) Int. Cl.
| | |
|---|---|
| *B01J 23/42* | (2006.01) |
| *B01J 23/745* | (2006.01) |
| *B01J 23/10* | (2006.01) |
| *B01J 21/04* | (2006.01) |
| *B01J 37/08* | (2006.01) |
| *B01J 35/00* | (2006.01) |
| *B01J 37/02* | (2006.01) |
| *B01J 37/06* | (2006.01) |
| *B01J 23/83* | (2006.01) |

(52) U.S. Cl.
CPC ............ *B01J 23/42* (2013.01); *B01J 21/04* (2013.01); *B01J 23/10* (2013.01); *B01J 23/745* (2013.01); *B01J 23/83* (2013.01); *B01J 35/0013* (2013.01); *B01J 37/0221* (2013.01); *B01J 37/06* (2013.01); *B01J 37/088* (2013.01)

(58) Field of Classification Search
CPC ... B01J 21/04; B01J 23/10; B01J 23/42; B01J 23/63; B01J 23/745; B01J 23/83; B01J 23/8906; B01J 35/0013; B01J 37/0221; B01J 37/06; B01J 37/088; C01B 32/50
See application file for complete search history.

(56) References Cited

U.S. PATENT DOCUMENTS

| | | |
|---|---|---|
| 4,187,168 A | 2/1980 | McVicker |
| 4,217,249 A | 8/1980 | McVicker |

(Continued)

OTHER PUBLICATIONS

Chen et al., "Highly active surfaces for CO oxidation on Rh, Pd, and Pt," Surf. Sci., 2007, 601:5326-5331.

(Continued)

*Primary Examiner* — Brian A McCaig
(74) *Attorney, Agent, or Firm* — Fish & Richardson P.C.

(57) ABSTRACT

A nanocatalyst including single atoms of platinum dispersed on a nanoscale metal oxide, and the nanocatalyst comprises 0.01 wt % to 1 wt % platinum. Preparing the nanocatalyst includes combining a solution comprising a nanoscale metal oxide and a compound containing a Group 10 metal to yield a mixture, aging the mixture for a length of time, filtering the mixture to yield a solid, washing the solid to eliminate water soluble anions, and calcining the solid to yield a nanocatalyst including single atoms or clusters of atoms of the Group 10 metal on the nanoscale metal oxide.

20 Claims, 4 Drawing Sheets

Related U.S. Application Data

(60) Provisional application No. 62/860,084, filed on Jun. 11, 2019.

(56) References Cited

U.S. PATENT DOCUMENTS

| | | | |
|---|---|---|---|
| 4,219,447 | A | 8/1980 | Wheelock |
| 6,221,805 | B1 | 4/2001 | Yamashita et al. |
| 6,967,183 | B2 | 11/2005 | Hampden-Smith et al. |
| 7,141,528 | B2 | 11/2006 | Hampden-Smith et al. |
| 7,243,658 | B2 | 7/2007 | Deevi et al. |
| 7,743,772 | B2 | 6/2010 | Sundar et al. |
| 7,767,615 | B2 | 8/2010 | Kinloch et al. |
| 7,879,128 | B2 | 2/2011 | El-Shall et al. |
| 8,020,567 | B2 | 9/2011 | El-Shall et al. |
| 8,058,202 | B2 | 11/2011 | Brady et al. |
| 8,360,073 | B2 | 1/2013 | Sundar et al. |
| 9,499,402 | B2 | 11/2016 | Chakraborty |
| 9,849,445 | B2 | 12/2017 | Vajda et al. |
| 9,855,549 | B2 | 1/2018 | Gao et al. |
| 10,035,133 | B2 | 7/2018 | Yang et al. |
| 10,385,032 | B1 | 8/2019 | Vajda et al. |
| 10,427,183 | B2 | 10/2019 | Granger et al. |
| 10,576,460 | B2 | 3/2020 | Toyama et al. |
| 10,640,435 | B2 | 5/2020 | Stair et al. |
| 10,654,772 | B2 | 5/2020 | Vajda et al. |
| 11,014,073 | B2 | 5/2021 | Egashira et al. |
| 11,046,585 | B2 | 6/2021 | Chopra et al. |
| 11,351,522 | B2 | 6/2022 | Lou et al. |
| 2005/0065026 | A1 | 3/2005 | Okubo |
| 2007/0292329 | A1 | 12/2007 | Tanaka et al. |
| 2020/0391185 | A1 | 12/2020 | Lou et al. |
| 2021/0016256 | A1 | 1/2021 | Liu et al. |

OTHER PUBLICATIONS

Duan et al., "Stability investigation of a high number density Pt1/Fe2O3 single-atom catalyst under different gas environments by HAADF-STEM," Nanotechnology, 2018, 29:204002 (10 pages).

Falsig et al., "Trends in the Catalytic CO Oxidation Activity of Nanoparticles," Angew. Chem. Int. Ed., 2008, 47:4835-4839.

Jones et al., "Thermally stable single-atom platinum-on-ceria catalysts via atom trapping," Science, Jul. 8, 2016, 353(6206):150-154.

Kuai et al., "Atomically Dispersed Pt/Metal Oxide Mesoporous Catalysts from Synchronous Pyrolysis-Deposition Route for Water-Gas Shift Reaction," Chemistry of materials, Aug. 16, 2018, 30:5534-5538.

Li et al., "Abstract: ES05.04.09 : Functional Nanoglues for Robust Single-Atom Catalysts," Presented at 2019 MRS Spring Meeting & Exhibit, Phoenix, Arizona, Apr. 22-26, 2019, 2 pages.

Li et al., "Anchoring Pt Single Atoms on CeOx Nanoclusters for CO Oxidation," Microsc. Microanal, 2018, 24(Suppl 1):1660-1661.

Li et al., "Functional CeOx Nanoglues for Robust Single-Atom Catalysts," Poster, Presented at 2019 North American Catalysis Society Meeting, Chicago, Illinois, Jun. 23-28, 2018, 3 pages.

Liu, "Catalysis by Supported Single Metal Atoms," ACS Catalysis, Oct. 18, 2016, 7:34-59.

Lou et al., "Super Active Pt1/Fe2O3 and Pt1/CeO2 Single-Atom Catalysts for CO Oxidation at Elevated Temperatures," NAM25 Poster, Jun. 4-9, 2017, 1 page.

Oran et al., "Mechanisms of CO oxidation reaction and effect of chlorine ions on the CO oxidation reaction over Pt/CeO2 and Pt/Ce02/y—Al2O3 catalysts," Appl. Catal. B: Environ., 2004, 54:183-191.

Ozawa et al., "Three way catalytic activity of thermally degenerated P1/Al2O3 and Pt/CeO2—ZrO2 modified Al2O3 model catalysts," Catalysis Today, 2015, 242:329-337.

Parkinson et al., "Carbon monoxide-induced adatom sintering in a Pd—Fe3O4 model catalyst," Nature Materials, Aug. 2013, 12:724-728.

Qiao et al., "Single-atom catalysis of CO oxidation using Pt1/FeOx," Nature Chemistry, Aug. 2011, 3:634-641.

Vile et al., "A Stable Single-Site Palladium Catalyst for Hydrogenations," Angew. Chem. Int. Ed., 2015, 54:11265-11269.

Wei et al., "Ultralow-temperature photochemical synthesis of atomically dispersed Pt catalysts for the hydrogen evolution reaction," Chemical Science, Jan. 19, 2019, 10(9):2830-2836.

Yang et al., "Catalytically active Au—O(OH)x-species stabilized by alkali ions on zeolites and mesoporous oxides," Science, Dec. 19, 2014, 346(6216):1498-1501.

Zhou et al., "CO Oxidation over Supported Pt Clusters at Different CO Coverage," Int. J. Quant. Chem., 2016, 116:939-944.

HIGHLY ACTIVE METAL OXIDE SUPPORTED ATOMICALLY DISPERSED PLATINUM GROUP METAL CATALYSTS

CROSS-REFERENCE TO RELATED APPLICATIONS

This application is a continuation of U.S. patent application Ser. No. 16/898,173 entitled "HIGHLY ACTIVE METAL OXIDE SUPPORTED ATOMICALLY DISPERSED PLATINUM GROUP METAL CATALYSTS" and filed on Jun. 10, 2020, which claims the benefit of U.S. Patent Application No. 62/860,084 entitled "HIGHLY ACTIVE METAL OXIDE SUPPORTED ATOMICALLY DISPERSED PLATINUM GROUP METAL CATALYSTS" and filed on Jun. 11, 2019, which are incorporated by reference herein in their entirety.

STATEMENT OF GOVERNMENT INTEREST

This invention was made with government support under 1465057 awarded by the National Science Foundation. The government has certain rights in the invention.

TECHNICAL FIELD

This invention relates to highly active reducible metal oxide supported atomically dispersed Group 10 (or platinum group metal) catalysts and fabrication of these catalysts.

BACKGROUND

Group 10 (or platinum group metal) catalysts have been widely utilized for heterogeneous catalytic reactions, especially as emission control catalysts. However, most of the platinum group metal (PGM) catalysts used in heterogeneous catalysis have a low atom efficiency, especially for catalytic reactions at relatively high reaction temperatures, since their dispersion is much less than 100%, especially for larger PGM particles. This low atom efficiency increases the amount of PGMs needed for desired catalytic performance, and increases the cost of supported PGM catalysts.

SUMMARY

This disclosure relates to Group 10 (platinum group metal or PGM) nanocatalysts (Pt, Pd, Rh, Ir, Ru) including isolated single PGM atoms or clusters of PGM atoms on reducible metal oxide supports, for which the atom efficiency of the PGMs approaches 100%. When these PGM atoms or clusters act as highly active catalytic centers, the loading levels of the PGM—and thus the cost of the fabricated catalysts—can be significantly reduced.

Fabrication of highly active metal oxide supported atomically dispersed PGM catalysts is described. These catalysts can possess high activities for oxidation of carbon monoxide (CO) to carbon dioxide ($CO_2$) in a wide temperature range. The total CO oxidation activity of the prepared catalysts can be more than 2 orders of magnitude greater than that of conventional nanoparticle counterparts typically used in automobile exhaust systems. Specifically, over the fabricated $Pt_1/Fe_2O_3$ and $Pt_1/CeO_2$ single-atom catalysts (SACs), the turnover frequency (TOF, defined as the number of product molecules per second per Pt atom within the catalyst) exceeds 1,500 $s^{-1}$ and 1,300 $s^{-1}$, respectively, for CO oxidation at 350° C., more than 100 times higher than that of their Pt nanoparticle counterparts for CO oxidation at the same temperature. These highly active, atomically dispersed catalysts can be applied as automobile emission or stationary emission control catalysts to significantly reduce or completely eliminate emission of CO molecules, a toxic air pollutant.

In a first general aspect, a nanocatalyst includes single atoms of platinum dispersed on a nanoscale metal oxide, and the nanocatalyst comprises 0.01 wt % to 1 wt % platinum. The nanoscale metal oxide may be in the form of nanocrystallites.

Implementations of the first general aspect may include one or more of the following features.

The nanoscale metal oxide includes one or more of $Fe_2O_3$, $FeO_x$, $CeO_2$, $CeO_x$, $TiO_2$, $TiO_x$, $CoO_x$, $Co_3O_4$, NiO, $Cu_2O$, CuO, $CuO_x$, $ZrO_x$, $NbO_x$, $MnO_x$ and $VO_x$. In some cases, the nanoscale metal oxide is supported on a refractory oxide comprising one or both of $Al_2O_3$ and $SiO_2$, mixtures of $Al_2O_3$ and $SiO_2$, cordierites, or mullites. When the nanoscale metal oxide is $Fe_2O_3$ or $FeO_x$, a turnover frequency for CO oxidation at 350° C. exceeds 500/s or 1500/s. When the nanoscale metal oxide is $CeO_2$ or $CeO_x$, a turnover frequency for CO oxidation at 350° C. exceeds 400/s or 1300/s.

In a second general aspect, preparing a nanocatalyst includes combining a solution including a nanoscale metal oxide and a compound containing a Group 10 metal to yield a mixture, aging the mixture for a length of time, filtering the mixture to yield a solid, washing the solid to eliminate water soluble anions, and calcining the solid to yield a nanocatalyst including single atoms or clusters of the Group 10 metal on the nanoscale metal oxide.

Implementations of the second general aspect may include one or more of the following features.

In one example, the Group 10 metal is platinum. The compound containing the Group 10 metal can be a Group 10 metal salt including an anion (e.g., chloride, nitrate, or acetate). Examples of suitable Group 10 metal salts include $H_2PtCl_4$, $H_2PtCl_6$, $Pt(NH_3)_2Cl_4$, $Pt(NH_3)_2Cl_2$, $H_2Pt(OH)_6$, or $Pt(NH_3)_4(NO_3)_2$. A concentration of the Group 10 metal is typically in a range of 0.001 wt % to 5 wt %, 0.005 wt % to 1 wt %, or 0.01 wt % to 0.5 wt % of the Group 10 metal. A concentration of the platinum is typically in a range of 0.001 wt % to 5 wt % or 0.01 wt % to 0.5 wt % of the metal oxide.

Each atom cluster of the Group 10 metal comprises two to about 10 atoms of the Group 10 metal, and has a largest dimension of less than 1 nm. The nanoscale metal oxide typically includes one or more of $Fe_2O_3$, $FeO_x$, $CeO_2$, $CeO_x$, $TiO_2$, $TiO_x$, $CoO_x$, $Co_3O_4$, NiO, $Cu_2O$, CuO, $CuO_x$, $ZrO_x$, $NbO_x$, $MnO_x$, and $VO_x$. The nanoscale metal oxide can be in the form of a powder or a nanocrystallite.

A pH of the solution is in a range of 0.5 to 7. In some cases, the compound containing the Group 10 metal is $H_2PtCl_4$ or $H_2PtCl_6$, and the pH is in a range of 2 to 5. In certain cases, the nanoscale metal oxide is $Fe_2O_3$, and a pH of the solution is in a range of 1 to 6 or 3 to 5. In certain cases, the nanoscale metal oxide is $CeO_2$, the compound containing the Group 10 metal is $H_2PtCl_4$ or $H_2PtCl_6$, and a pH of the solution is in a range of 1 to 5. In certain cases, the nanoscale metal oxide is $Fe_2O_3$, the compound containing the Group 10 metal is $Pt(NH_3)_4(NO_3)_2$, and a pH of the solution is greater than 10. In certain cases, the nanoscale metal oxide is $CeO_2$, the compound containing the Group 10 metal is $Pt(NH_3)_4(NO_3)_2$, and a pH of the solution is greater than 10.

Aging the mixture can include aging the mixture at a temperature between room temperature and 60° C. In some cases, the solid is dried at a temperature less than 120° C. before calcining the solid.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1A:
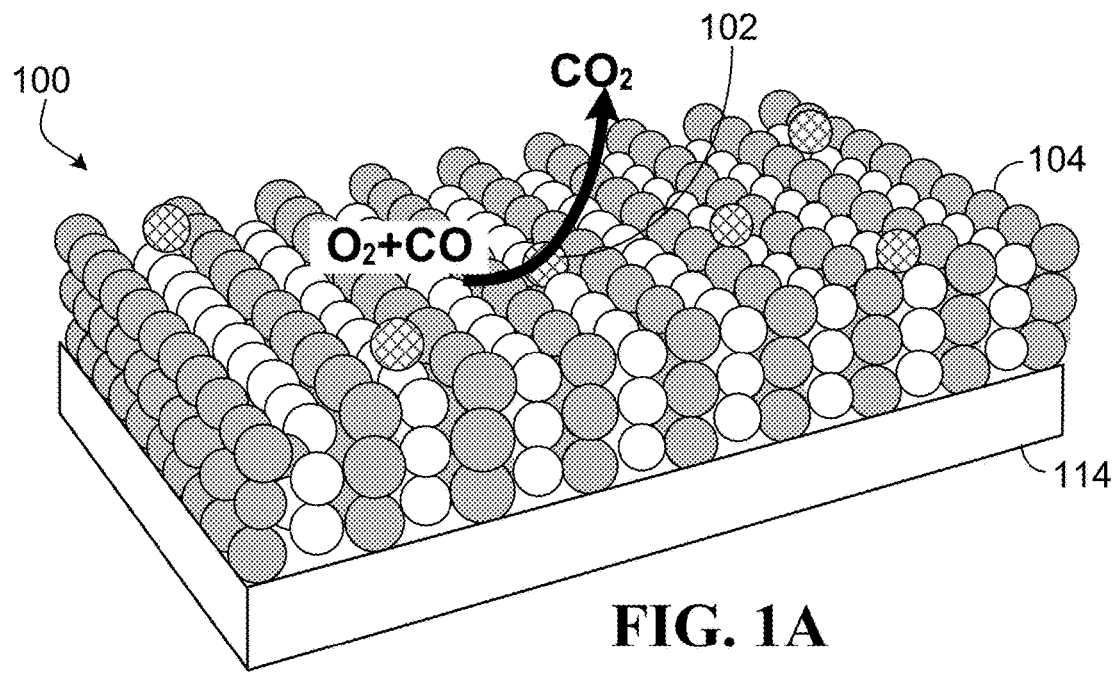
FIGS. 1A and 1B depict oxidation of carbon monoxide in the presence of Pt single-atom catalysts (SACs) and cluster catalysts, respectively.

Atomically dispersed Group 10 (platinum group metal or PGM) catalysts are synthesized via a modified adsorption method by finely tuning wet chemistry processing parameters including solution pH value, treatment of support materials, volume ratio of metal salt to $H_2O$, solution temperature, and degree of solution mixing. The optimized synthesis protocols depend at least in part on the specific PGM and the chosen support material.

In one example, $Fe_2O_3$ and $CeO_2$ nanocrystallites were synthesized by a precipitation method in which 10.0 gram iron (III) nitrate nonahydrate ($Fe(NO_3)_3 \cdot 9H_2O$, Sigma-Aldrich) or 10.0 gram cerium(III) nitrate hexahydrate (Ce$(NO_3)_3 \cdot 6H_2O$, Sigma-Aldrich) was used as a precursor salt and dissolved into 200 ml deionized (DI) $H_2O$. 4.7 gram sodium carbonate ($Na_2CO_3$, Sigma-Aldrich) was dissolved in 200 ml DI $H_2O$ as a precipitant. The sodium carbonate solution was slowly added into the $Fe(NO_3) \cdot 9H_2O$ solution under rigorous stirring. The addition rate of the $Na_2CO_3$ aqueous solution was maintained at ~1.25 ml/min or lower. The resultant solid powder precipitates were dried at 60° C. for 12 hours in air. The $Fe_2O_3$ powders were then calcined at 350° C. for 4 hours in air. The $CeO_2$ powders were calcined at 400° C. for 5 hours in air. The $\gamma-Al_2O_3$ powders were used as control support materials and were purchased from Inframat Advanced Materials.

Isolated single Pt atoms were dispersed onto the surfaces of $Fe_2O_3$, $CeO_2$, and $\gamma-Al_2O_3$ by a strong electrostatic adsorption method. In one example, 500 mg calcined $Fe_2O_3$ powders were dispersed into 120 ml DI $H_2O$ and the solution pH value was adjusted to 3.0 by adding dilute HCl solution. The appropriately controlled pH value of the salt solution facilitates the adsorption of isolated single Pt atoms and at least in part determines the total amount of Pt atoms that can be adsorbed onto the support surfaces. The corresponding amount (calculated based on the desired weight % of Pt in the catalyst) of chloroplatinic acid hexahydrate ($H_2PtCl_6$) was dissolved into 50 ml DI $H_2O$. Then the $H_2PtCl_6$ aqueous solution was slowly added into the $Fe_2O_3$ solution under rigorous stirring. The addition rate of the $H_2PtCl_6$ aqueous solution was maintained at ~0.42 ml/min or slower. After completing the addition of the $H_2PtCl_6$ aqueous solution into the $Fe_2O_3$ solution, the mixed solution was aged for 2 hours at room temperature. Then the solid precipitates were filtered and dried at 60° C. for 12 hours in air. The precipitant was filtered and washed by DI $H_2O$ until there were no Cl$^-$ ions detected by saturated $AgNO_3$ solution. The powders were then calcined at 300° C. for 2 hours in air with a heating rate of 1° C./min from room temperature to 300° C.

Similar processes were used to prepare the $Pt/\gamma-Al_2O_3$ and $Pt/CeO_2$ single-atom catalysts. The actual loadings of the adsorbed Pt can be measured by ICP-MS (Inductively Coupled Plasma-Mass Spectrometry). In one example, the Pt loadings were determined to be 0.029 wt %, 0.013 wt %, and 0.034 wt % on the $Fe_2O_3$, $CeO_2$, and $\gamma-Al_2O_3$ support surfaces, respectively.

In another example, isolated single Pd atoms were dispersed onto the surfaces of $Fe_2O_3$ powders by a strong electrostatic adsorption method. The corresponding amount of Pd ($PdCl_2$, Sigma-Aldrich) was first deposited onto the surfaces of the fabricated $Fe_2O_3$ powders. The pH value of the Pd-containing solution was finely controlled to tune the adsorption amount. After being aged at room temperature for 2 hours and filtered, the solid powders were dried at 60° C. for 12 hours in air. The $Pd/Fe_2O_3$ powders were then thoroughly washed with DI water and calcined at 300° C. for 2 hours in air. In one example, the actual loading of the Pd on the $Fe_2O_3$ surfaces was 0.17 wt % by ICP-MS.

For preparation of control catalysts, colloidal Pt particles were dispersed onto the surfaces of the fabricated $Fe_2O_3$ and $CeO_2$ powders. In one example, NaOH (2.32 mmol) and $H_2PtCl_6 \cdot 6H_2O$ (5.16 μmol) was added into 13.3 mL glycol solution under stirring for 1 hour at ambient temperature. The resulting solution was then heated to 140° C. and maintained at 140° C. for 4 hours to produce a brownish colloidal solution. After the colloidal solution was cooled down to room temperature, 100 mg $Fe_2O_3$ (or $CeO_2$) powders were dispersed into the colloidal solution under rigorous stirring. After being stirred for 2 hours, the precipitate was filtered and washed thoroughly with distilled water until the filtrate was free of chloride ions (tested by saturated $AgNO_3$ solution). The resultant precipitate powders were then dried at 60° C. for 12 hours in air and subsequently were calcined at 350° C. for 4 hours in air.

Table 1 shows the calculated specific reaction rates of Pt at 350° C. (mmol CO/(g Pt·s)) for different $O_2$/CO ratios.

TABLE 1

Specific reaction rates of Pt at 350° C.
(mmol CO/($g_{Pt}$·s)) for different $O_2$/CO ratios.

| Samples | $O_2$/CO = 4.0 | $O_2$/CO = 1.0 | $O_2$/CO = 0.5 |
|---|---|---|---|
| $Pt_1/Fe_2O_3$ SAC | 7344.2 | 7908.3 | 2844.2 |
| Nano-$Pt/Fe_2O_3$ | 39.3 | 193.2 | 85.6 |
| $Pt_1/CeO_2$ SAC | 3906.6 | 7121.5 | 4370 |
| $Pt/Al_2O_3$ | / | 0.2 | / |
| $Pt/CeO_2/Fe_2O_3$ | / | 1.0 | / |

The specific reaction rates of $Pt_1$ atoms and Pt particles were measured with feed gas of 1.0 vol. % CO, 4.0 vol. % $O_2$ and He balance ($O_2$/CO = 4.0); 2.5 vol. % CO, 2.5 vol. % $O_2$ and He balance ($O_2$/CO = 1.0); and 2.5 vol. % CO, 1.25 vol. % $O_2$ and He balance ($O_2$/CO = 0.5).

Figure 1B:
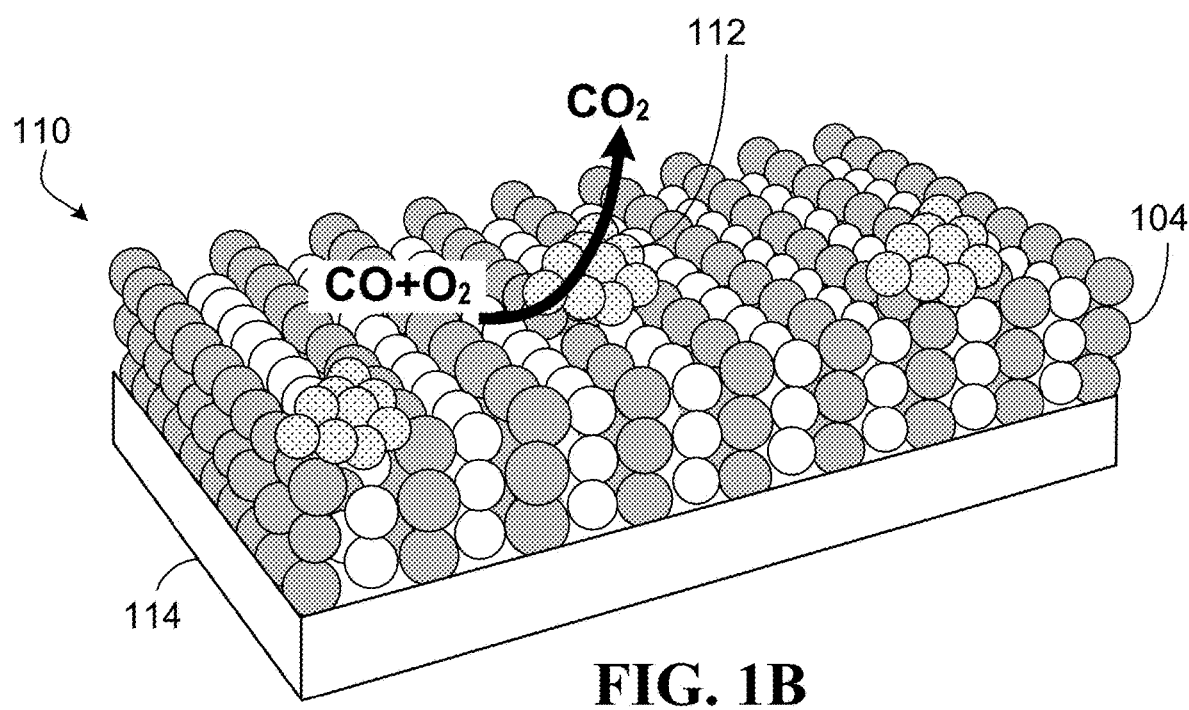
Figure 2A:
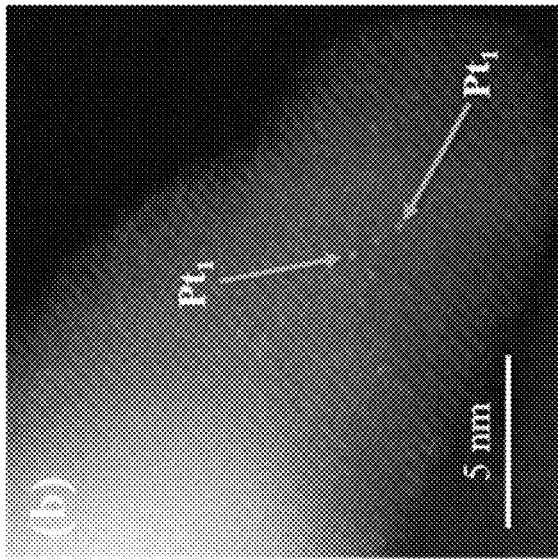
FIGS. 2A-2D show aberration-corrected high-angle annular dark-field images of used (after CO oxidation at 350° C.) and freshly fabricated $Pt_1/Fe_2O_3$ and used (after CO oxidation at 350° C.) and freshly fabricated $Pt_1/CeO_2$ SACs, respectively.
Figure 2B:
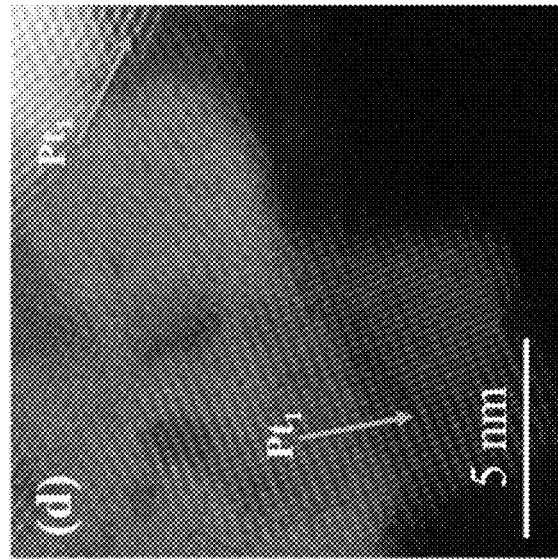
Figure 2C:
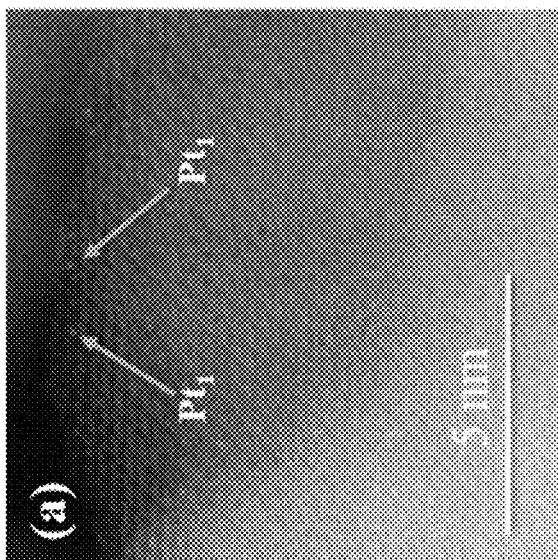
Figure 2D:
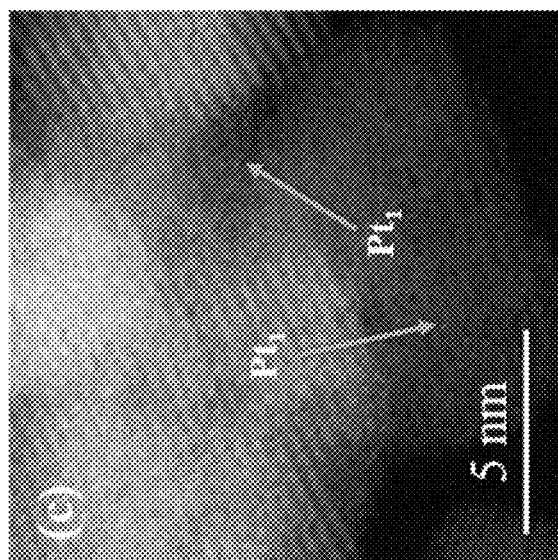

FIGS. 1A and 1B depict oxidation of carbon monoxide in the presence of platinum nanoscale catalysts (or nanocatalysts), including single-atom catalysts (SACs) 100 and cluster catalysts 110, respectively. Single-atom catalyst 100 includes one or more single platinum atoms 102 on metal oxide 104. Cluster catalyst 110 includes one or more platinum clusters 112 on metal oxide 104. Each platinum cluster 112 includes at least two (e.g., two to about ten) platinum atoms. Clusters 112 may be referred to as subnanoclusters with a largest dimension (e.g., diameter) of less than 1 nm. In comparison, platinum nanoparticles are understood to have a smallest dimension (e.g., a diameter) exceeding 2 nm. Platinum single-atom catalysts 100 and cluster catalysts 110 typically include 0.01 wt % to 1 wt % platinum.

Metal oxide 104 is a nanoscale metal oxide in the form of nanoparticles, nanorods, nanoplates, or other types of nanostructures having one or more dimensions (e.g., all dimensions) in the range of 3 nm to 100 nm. In some cases, metal oxide 104 is typically in the form of crystallites (e.g., nanocrystallites). Metal oxide 104 is typically a metal oxide, preferably a reducible metal oxide. Examples of suitable metal oxides include $Fe_2O_3$, $FeO_x$, $CeO_2$, $CeO_x$, $TiO_2$, $TiO_x$, $CoO_x$, $Co_3O_4$, $NiO$, $NiO_x$, $Cu_2O$, $CuO$, $CuO_x$, $ZrO_2$, $ZrO_x$, $NbO_x$, $MnO_x$, and $VO_x$.

In some cases, platinum single-atom catalysts 100 and cluster catalysts 110 are on a high-surface-area (at least 50 $m^2/g$ or at least 100 $m^2/g$) support 114. Examples of suitable supports for nanoscale metal oxides include refractory oxides, such as $Al_2O_3$, $SiO_2$, $MgO$, $ZrO_2$, cordierites, mullites, or a combination thereof.

FIGS. 2A-2D show aberration-corrected high-angle annular dark-field images of used (after CO oxidation at 350° C.) and freshly fabricated $Pt_1/Fe_2O_3$ and used and freshly fabricated $Pt_1/CeO_2$ SACs, respectively.

Figure 3:
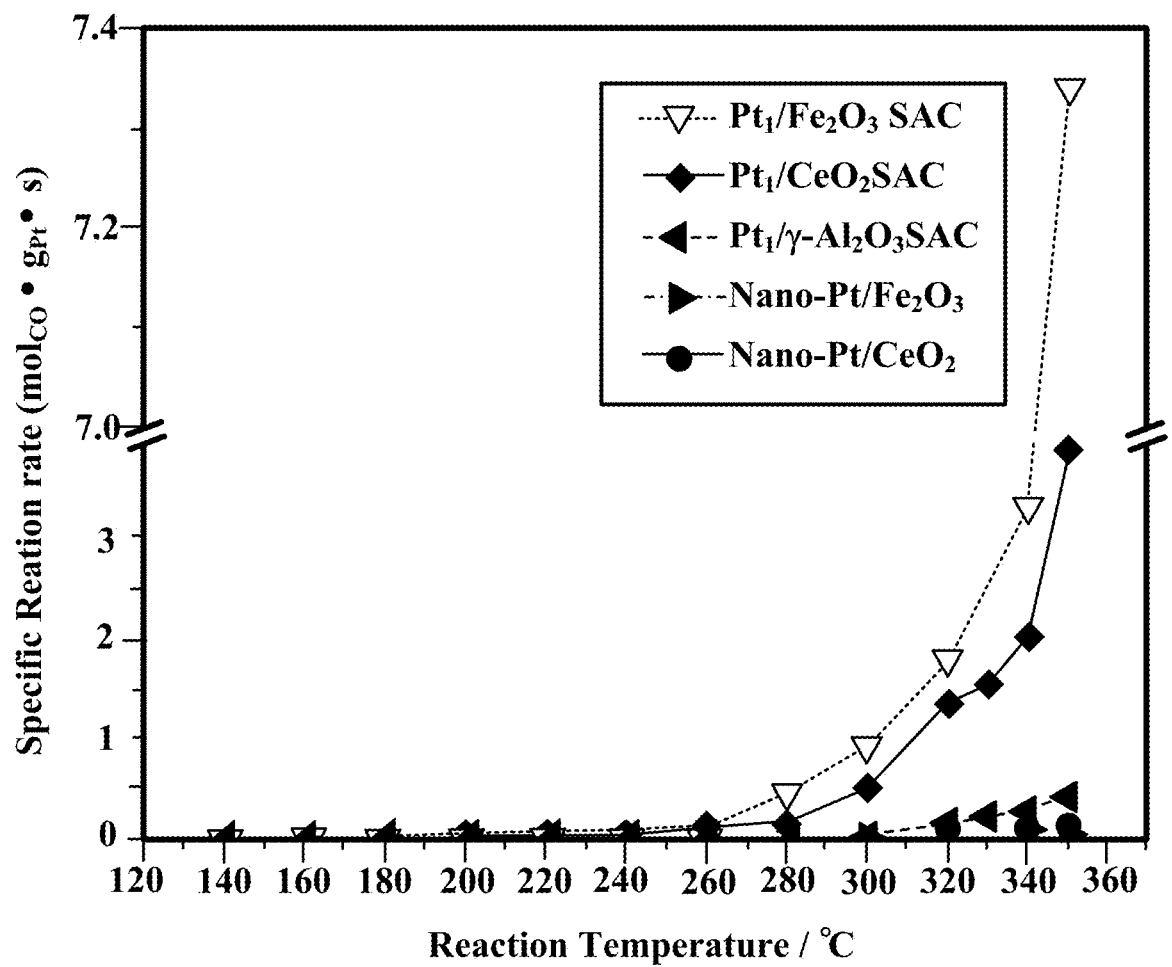
FIG. 3 shows specific reaction rates of $Pt_1$ SACs ($Pt_1/Fe_2O_3$, $Pt_1/CeO_2$, and $Pt_1/\gamma-Al_2O_3$) and their nanoparticle counterparts (nano-$Pt/CeO_2$ and nano-$Pt/Fe_2O_3$) for CO oxidation versus reaction temperature with a feed gas of 1 vol % CO, 4 vol % $O_2$, and He balance, a space velocity of 9,000 L/gh to 45,000 L/gh, and a pressure of 0.1 MPa.

FIG. 3 shows specific reaction rates of single $Pt_1$ atoms ($Pt_1/Fe_2O_3$ SAC, $Pt_1/CeO_2$ SAC and $Pt_1/\gamma$-$Al_2O_3$ SAC) and nanoparticle Pt (nano-$Pt/CeO_2$ and nano-$Pt/Fe_2O_3$) catalysts for CO oxidation versus reaction temperature with a feed gas of 1 vol % CO, 4 vol % $O_2$, and He balance, a space velocity of 9,000 L/gh to 45,000 L/gh, and a pressure of 0.1 MPa.

Figures 4A, 4B:
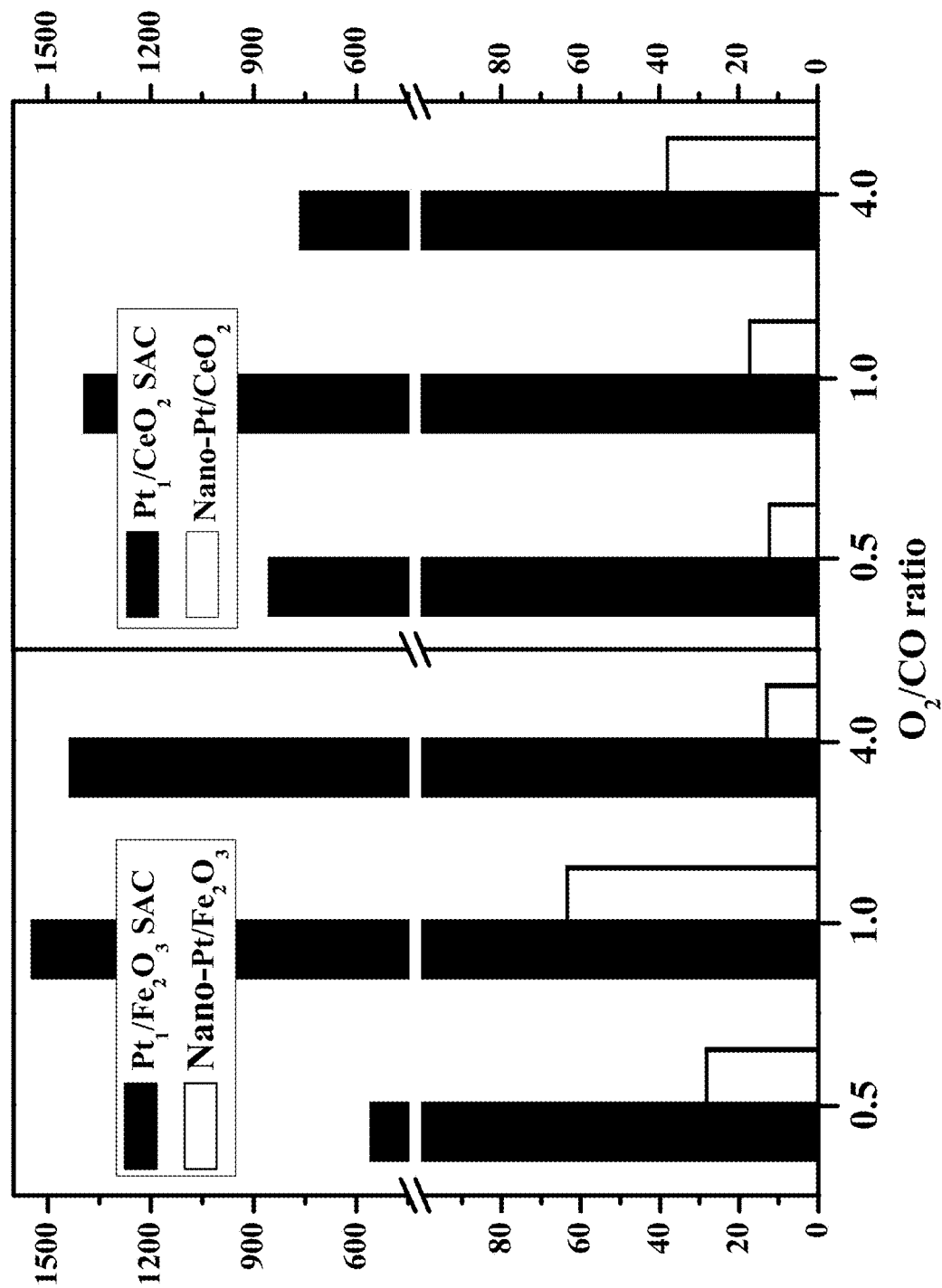
FIG. 4A shows the turnover frequency (TOF) of $Pt_1/Fe_2O_3$ SAC and nano-$Pt/Fe_2O_3$ catalyst.
FIG. 4B shows the TOF of $Pt_1/CeO_2$ SAC and nano-$Pt/CeO_2$ catalyst.

FIG. 4A shows the TOF of $Pt_1/Fe_2O_3$ SAC and nano-$Pt/Fe_2O_3$ catalyst. FIG. 4B shows the TOF of $Pt_1/CeO_2$ SAC and nano-$Pt/CeO_2$ catalyst.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of preparing a nanocatalyst, the method comprising:
   combining a solution comprising a nanoscale metal oxide and a compound containing a Group 10 metal to yield a mixture;
   aging the mixture for a length of time;
   filtering the mixture to yield a solid;
   washing the solid to eliminate water soluble anions; and
   calcining the solid to yield a nanocatalyst comprising single atoms of the Group 10 metal or atom clusters of the Group 10 metal on the nanoscale metal oxide,
   wherein the nanoscale metal oxide is $CeO_2$, the Group 10 metal is platinum, the compound containing the Group 10 metal is $Pt(NH_3)_4(NO_3)_2$, and a pH of the solution is greater than 10.

2. The method of claim 1, wherein a concentration of the platinum is in a range of 0.001 wt % to 5 wt % of the metal oxide.

3. The method of claim 1, wherein aging comprises aging the mixture at a temperature between room temperature and 60° C.

4. The method of claim 1, further comprising drying the solid at a temperature less than 120° C. before calcining the solid.

5. The method of claim 1, wherein the nanocatalyst comprises 0.001 wt % to 5 wt % of the Group 10 metal.

6. The method of claim 1, wherein the nanoscale metal oxide is in powder form.

7. The method of claim 1, wherein the nanoscale metal oxide is in the form of nanocrystallites.

8. The method of claim 1, wherein each atom cluster of the Group 10 metal comprises two to about 10 atoms of the Group 10 metal.

9. The method of claim 8, wherein each atom cluster has a largest dimension of less than 1 nm.

10. The method of claim 1, further comprising preparing the nanoscale metal oxide.

11. The method of claim 10, wherein preparing the nanoscale metal oxide comprises precipitating a solid from an aqueous solution comprising iron nitrate.

12. The method of claim 11, wherein precipitating the solid comprises combining sodium carbonate with the aqueous solution.

13. The method of claim 12, wherein combining the sodium carbonate comprises adding a sodium carbonate solution to the aqueous solution.

14. The method of claim 13, further comprising drying the solid.

15. The method of claim 14, wherein drying the solid occurs in air at a temperature of 60° C.

16. The method of claim 14, further comprising calcining the solid to yield the nanoscale metal oxide.

17. The method of claim 16, wherein calcining the solid comprises heating the solid in air at 350° C.

18. The method of claim 17, wherein calcining the solid comprises heating the solid for 4 hours.

19. The method of claim 10, wherein nanoscale metal oxide comprises nanoparticles.

20. The method of claim 10, wherein a dimension of nanoscale metal oxide is in a range of 3 nm to 100 nm.

* * * * *